United States Patent [19]

Westphal et al.

[11] Patent Number: 5,227,755
[45] Date of Patent: Jul. 13, 1993

[54] WINDING CONFIGURATION FOR A CRYOMAGNET

[75] Inventors: Michael Westphal, Offenbach; Wolfgang H. G. Müller; Arne Kastep, both of Karlsruhe, all of Fed. Rep. of Germany

[73] Assignee: Bruker Analytische Messtechnik GmbH, Fed. Rep. of Germany

[21] Appl. No.: 635,631

[22] PCT Filed: Jul. 13, 1989

[86] PCT No.: PCT/DE89/00463
  § 371 Date: Jan. 11, 1991
  § 102(e) Date: Jan. 11, 1991

[87] PCT Pub. No.: WO90/00803
  PCT Pub. Date: Jan. 25, 1990

[30] Foreign Application Priority Data

Jul. 15, 1988 [DE] Fed. Rep. of Germany ....... 3824042

[51] Int. Cl.$^5$ .............................................. H01F 1/00
[52] U.S. Cl. ................................... 335/216; 335/299; 505/1
[58] Field of Search .................. 335/216, 299; 361/19; 29/599; 505/1, 879, 884, 887; 174/125.1

[56] References Cited

U.S. PATENT DOCUMENTS

| | | | |
|---|---|---|---|
| 4,195,199 | 3/1980 | Hillman | 29/599 X |
| 4,395,584 | 7/1983 | Ries | 335/216 X |
| 4,727,346 | 2/1988 | Westphal et al. | 335/216 |

FOREIGN PATENT DOCUMENTS

| | | |
|---|---|---|
| 3532396 | 9/1985 | Fed. Rep. of Germany . |
| 58-93254 | 10/1984 | Japan ................................. 335/216 |
| 1463292 | 2/1977 | United Kingdom . |

OTHER PUBLICATIONS

Cryogenic Engineering, The proceedings of the First Cryogenic Engineering Conference held in Tokyo and Kyoto, Japan on Apr. 9–13, 1967.

Heywood Temple Industrial Publications Ltd., pp. 112–114: "Large Superconducting Magnets for M. H. D.", p. 114, FIG. 6.

IEEE Transactions on Nuclear Science, vol. NS-16, No. 3, Jun. 1969, New York US pp. 720–722; W. B. Sampson et al.: "Superconductings Synchrotron Magnets".

The Proceedings of the Seventh Symposium on Engineering Problems of Fusion Research Hyatt Regency Knoxville, Tenn. USA. Oct. 25–28, 1977 IEEE Pub. No. 77CH1267-4-NPS, pp. 1310–1314: "Fast Ramp Superconductor for Ohmic Heating Coils".

Nuclear Technolox Fusion, vol. 3, No. 2, Sep. 1983, La Grange Park, Ill. pp. 1346–1351; W. Chen and E. T. Cheng: "A Minimum-Thickness Low-Activation Toroidal Field Coil Concept Fotrokamak Reactors".

Primary Examiner—Leo P. Picard
Assistant Examiner—Trinidad Korka
Attorney, Agent, or Firm—Walter A. Hackler

[57] ABSTRACT

Winding arrangements for cryomagnets have a winding of superconducting wire (12) connected in parallel to a winding of normally conducting wire (11) which, in the event of a quench, conducts the operating current and mechanically stabilizes the winding arrangement. Independently of this, the size of such a winding arrangement depends primarily on the tensile forces exerted on the wires and on the modulus of elasticity of the material of the wire. The size of such a winding arrangement is a significant factor in its cost and should therefore be reduced. According to the invention, the winding arrangement has a plurality of groups (17) arranged in radially repetitive layers inside the winding section, in which each winding of superconducting wire surrounds windings of a normally conducting wire and windings of steel wire or of a wire with a high modulus of elasticity.

13 Claims, 3 Drawing Sheets

PRIOR ART

WINDING CONFIGURATION FOR A CRYOMAGNET

BACKGROUND OF THE INVENTION

The invention concerns a winding configuration for a cryomagnet with at least one winding section, said section consisting of a parallel connection of a winding made from wire which is superconducting at the operating temperature and a winding made from normally conducting wire.

Such a winding configuration is known in the art from DE-A 35 32 396. This known winding configuration exhibits many winding sections each of which consists of a parallel connection of a winding made from wire which is superconducting at the operating temperature and a winding made from normally conducting wire. The individual windings each form a layer of the winding configuration and two separated layers are connected in parallel to form a winding section. The layers formed from normally conducting windings are composed of copper wire and serve not only the purpose of guaranteeing good quench dispersion, but also function as bindings which prevent an unacceptable stretching of the superconducting wire windings due to tensile stresses occurring in the superconducting wire.

The size of the known winding configuration with the described construction is determined by two factors, namely by the limiting value for the product between the current density and the magnetic field strength, and the cross section of the normally conducting material necessary for current take-over in case of a quench. The cryomagnet winding configuration sizes stemming from these factors impact on the weight, especially in cases involving cryomagnets with large inner diameters such as those used in magnetic resonance imaging. Winding configurations for superconducting tomography magnets achieve a weight on the order of several metric tons, so material costs represent a significant factor in the costs of the winding configuration. Moreover, problems associated with mounting such winding configurations in a cryostat increase with the weight of the winding configuration. Accordingly, measures which allow a reduction in the weight of such winding configurations would abate many problems associated with the construction of cryomagnets and, at the same time, lead to cost savings.

Known in the art from patents DE-A 26 02 735, DE-A 33 29 390 and from the scientific technical journal "IEEE Transactions on Magnetics " MAG -23 (1987), pages 914 through 917, as well as from the article "Large Superconducting Magnets for M.H.D." by Z. J. J. Stekly on pages 112–114 in the Journal "Cryogenic Engineering, The Proceedings of the First Cryogenic Engineering Conference held in Tokyo and Kyoto, Japan on Apr.9-13, 1967", are various ready-made superconductor wires of cables with which winding configurations for cryomagnets can be manufactured. Each of these ready-made wires or cables is so dimensioned as to satisfy the requirements on superconductivity and normal conductivity as well as on mechanical stability. In manufacturing a complete winding configuration for a cryomagnet, each part of the ready-made wire or cable must satisfy the most stringent mechanical requirements occurring within the entire winding configuration since in using these types of ready-made wire or cable, a position dependent variation within the winding structure is not possible. This represents, likewise, a substantial design restriction for the winding configuration in its entirety. Furthermore, these types of ready-made wire are too expensive for the manufacture of winding configurations with large inner diameters such as those needed in tomography magnets.

Various cryomagnet winding configuration structures are known in the art from the technical publication "The Review of Scientific Instruments" 36 (1965), pages 825 through 830. One of the known winding configurations has a foil layer between two respective winding layers, which can be strengthened with a metal mesh. If present, this type of metal mesh strengthened foil located between two counter-wound layers effects a stable mechanical localization of the individual layer windings against each other, such that springing of windings against each other due to the axial forces which occur should be avoided. The avoidance of such a springing of windings is necessary in order to exclude the occurrence of a thereby caused quench release. The metal mesh within the foil is, however, necessarily put into place between the winding layers without being stretched in the circumferential direction and, therefore, does not serve as radial mechanical support for the underlying winding wire.

With respect to this prior art, it is the purpose of the present invention to further develop a winding configuration of the above mentioned kind in such a way that said winding can be economically manufactured with substantially reduced volume.

SUMMARY OF THE INVENTION

The winding configuration according to the invention permits the use of a superconducting wire with a very small ratio between copper cross section and the cross section of the superconducting filaments in comparison to said ratio in superconducting wires of prior art since the size of the superconducting wires is determined only by its current carrying capability function. The windings from normally conducting copper wire or from a material with a conductivity better than $5.8 \times 10^7$ Sm$^{-1}$ must only serve thermal conductivity and current take-over functions in the event of normal conduction, that is to say if a quench occurs within the superconducting wire, without having to take on the additional task demanded by prior art of providing sufficient mechanical support for the superconducting wire. The mechanical support function is essentially taken over by the windings made from steel wire or from a material with a modulus of elasticity which is higher than that of copper at the operating temperature of the winding configuration. Through this separation of functions among the three different wires, the winding configuration according to the invention can optimize each individual wire for its function. In this manner, it is possible according to the invention to reduce the total number of windings or the total number of winding layers within the winding configuration, to effect a substantial savings in volume, and to decrease the weight of the winding configuration according to the invention in comparison to prior art configurations.

As mentioned, in winding configurations of prior art, the copper cross section used is not, in its entirety, necessary in order to take on the current occurring in case of a quench since by using a special winding configuration design, in case of a quench the occurrence of a rapid even distribution of current in the normally conducting wire winding can be provided for without local current peaks which, in turn, would require a very large copper cross section in order to prevent local over-heating and resulting damage. In so far as the normally conducting wire is necessary in order to mechanically strengthen the winding configuration, said wire can also be replaced with another material of higher modulus of elasticity (E-modulus) the necessary amount of which is therefore less than that of the copper wire used up to now for this purpose. In this manner, a noteworthy result is already accomplished if the E-modulus of the material used is at least 1.2 times the E-modulus of copper.

In addition to mechanical strengthening, it also turns out to be possible using such a material to increase, above previous levels, the limiting value for the product between the amount of current flowing through the coil and the magnetic field strength. In this way, the windings made from superconducting wire can be arranged in closer proximity to another and, if appropriate, the strength of the current flowing through the magnet coil can be increased so that the volume of the winding configuration can be reduced. In this way substantial material savings can be achieved and problems associated with producing a stable winding configuration and with the mounting of said configuration in a cryostat can be reduced.

The winding configuration according to the invention need, by no means, be homogeneous in the axial and radial directions, rather the cross section density of the three individual wires can vary as a function of position. Through variation of the individual number of windings per cross section surface for the individual wire types, the average current density in the radial and axial directions can be varied, which, in turn, gives the designer increased freedom in coil design while fulfilling the field homogeneity requirements. Accordingly, it is sufficient for the winding configuration according to the invention to only have a specific structure within one axial and radial winding section.

Through the use of a ferromagnetic steel for the steel wire winding, a charging of the coil leads to a saturated magnetization of the ferromagnetic wire winding which, in turn, contributes to the entire magnetic field strength in a predeterminable manner. This additional magnetic field allows a homogeneous field to be achieved even with coils whose lengths are shortened with respect to coil lengths necessary when using non-ferromagnetic steel. All together, through these means, the tensile load acting on the individual wires under operating conditions turns out to be lower.

BRIEF DESCRIPTION OF THE DRAWINGS

An embodiment according to prior art and embodiments according to the present invention will be illustrated in detail below through reference to the accompanying illustrations.

DETAILED DESCRIPTION

Figure 1:
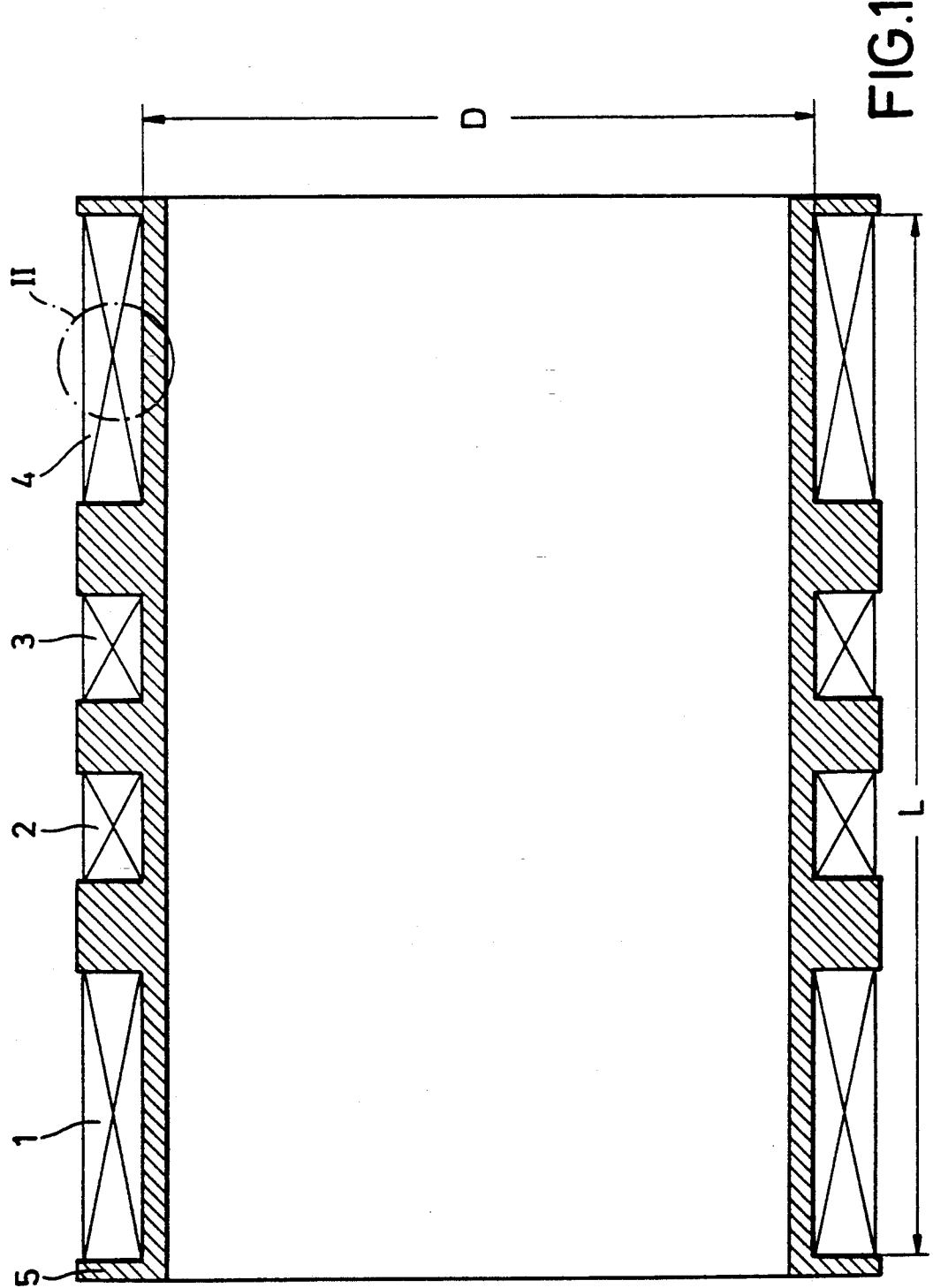
FIG. 1. a lengthwise cut through a cryomagnet winding configuration.

FIG. 1 is a rendering of the typical construction of a tomography system cryomagnet winding configuration. In this winding configuration, the winding is distributed among four chambers 1, 2, 3, 4, which are located on the circumference of coil spool 5. The coil formed by the windings arranged in the chambers 1 through 4 has an overall length of L=1700 mm and an inner diameter of D=1080 mm. The magnetic field in the inner center of the winding configuration has a strength of 3.65 Tesla, whereas the maximum field strength occurring within the winding in the direction of the coil axis has a value Bmax of 4.74 Tesla.

Figure 2:
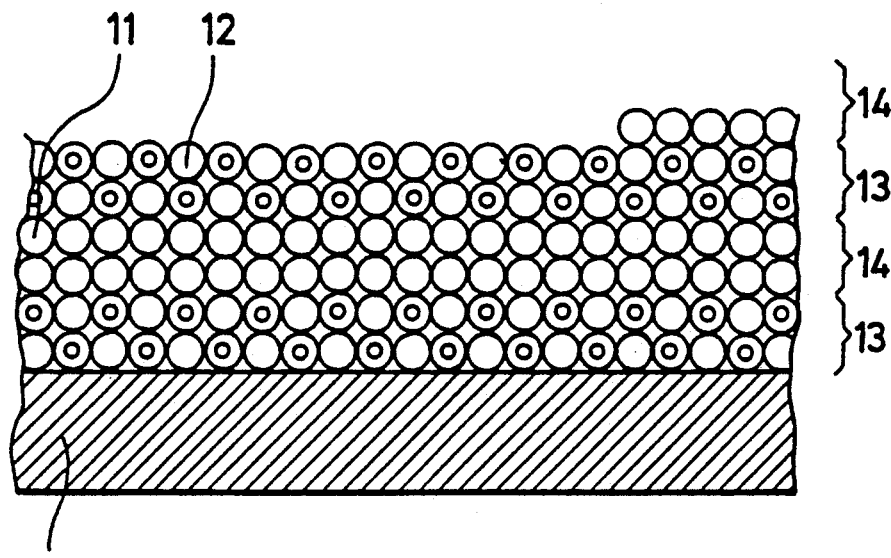
FIG. 2. expanded view of a winding section in the vicinity of region II according to FIG. 1 with winding layer arrangements of prior art.
Figure 3:
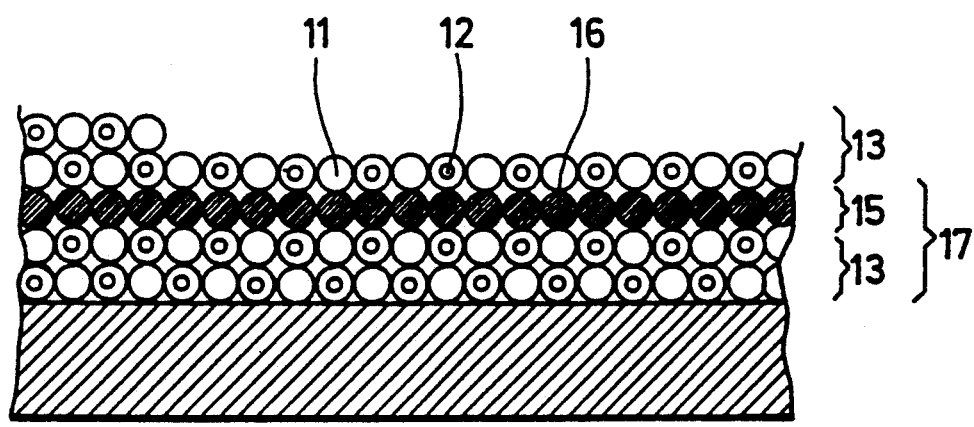
FIG. 3. a first embodiment of a winding configuration according to the invention in a representation corresponding to FIG. 2.

According to prior art, it is possible that the winding configuration of such a coil has the construction represented in FIG. 2. The windings which are arranged in the individual chambers on the coil spool 5 each consist of sixty layers of normally conducting copper wire 11 and of wire 12 which is superconducting at the operating temperature. The wires used have a stripped-wire cross section of 1.5 mm each and, when varnished, a cross section of 1.6 mm. As can be seen from FIG. 2, the copper wire and the superconducting wire in the winding configuration are present in the ratio 3:1, and namely in the form of two layers 13 each of bifilar wound copper wire and superconducting wire alternating with two layers 14 each of copper wire. The cross section ratio between copper and superconductor in the superconducting wire is 1.8.

A winding configuration constructed in this fashion has a weight of 2.8 metric t, of which 0.7 metric t are due to the superconducting wire and 2.1 metric t to the copper wire. The operating current IN is 557 A, while the critical current IC at the mentioned maximum field within the winding of 4.7 Tesla is 1300 A. Therewith results a relative current load IN/IC=0.43.

With these values, as a result of Lorentz forces, there turns out to be a maximum free tensile stress in the superconducting wire of $$o = IN*Bmax*r/q = 800 \text{ MPa}.$$

In this relationship, r is the radius of the winding at the position of the maximum magnetic field and q the cross sectional area of the superconducting wire. As a result of the binding action of the copper wire both in the bifilar layers 13 as well as in the layers 14 made from pure copper, that is to say through the support of inner loaded layers by outer unloaded layers, there results a reduced tensile stress in the superconducting wire $$o = \frac{1}{2} o\text{max} * \frac{1}{v + 1} = 100 \text{ MPa}$$

Whereby, v designates the number of normally conducting windings per superconducting winding.

A winding configuration designed in accordance with the invention can be derived from the winding configuration designed according to prior art that is represented in FIG. 2, if one replaces both copper wire layers 14 with a single layer 15 made from 1.6 mm diameter steel wire. Since the E-modulus of steel is about twice as large as the E-modulus of copper, the single steel wire layer 15 has the same binding action as the double layer 14 made from copper wire which is present in the winding configuration of FIG. 2. In this manner, the number of winding configuration layers is reduced from sixty to forty five, namely to fifteen double layers 13 made from bifilar lain copper wire 11 and superconducting wire 12 alternated with one layer 15 each of steel wire 16. The double layers 13 and the single layer 15 sequences repeat themselves in the radial direction forming layer groups 17. Because of the reduction in the number of winding configuration layers in comparison to prior art, the weight of the winding is reduced to 2.1 metric t from which, in turn, 0.7 metric t result from the weight of the superconducting wire, but only 0.7 metric t from the weight of the copper wire, and likewise 0.7 metric t from the steel wire. In this manner, in comparison to a winding of conventional construction, a savings of 25% in both volume as well as in weight is achieved. As a result, substantial savings in material costs are realized and problems associated with the mounting of the windings in the cryostat are diminished. In consequence of the reduced weight, the support elements with which the winding configuration is fixed in the cryostat can be mechanically weaker, that is to say, of reduced cross section. In this manner, the heat transfer from the inside to the outside of the cryostat is, in turn, diminished so that, herewith, as well as in consequence of the reduced outer surface of the cryostat resulting from its reduced diameter, a reduction in helium consumption is achievable.

Figure 4:
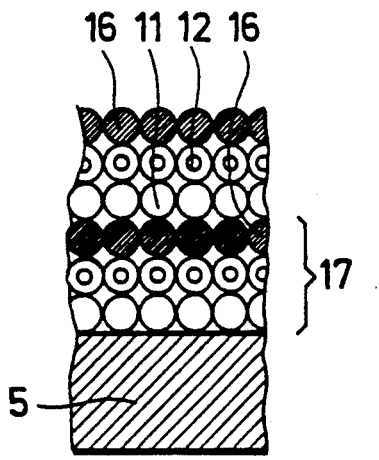
FIG. 4. through 8. second through sixth embodiments of the winding configuration according to the invention in a representation corresponding to the section of FIG. 2.

In the modified embodiment shown in FIG. 4, a layer group 17 includes an innermost layer of normally conducting wire 11, a superconducting wire layer 12 surrounding said normally conducting wire layer, and a layer made from steel wire 16 encasing the layer group 17.

Figure 5:
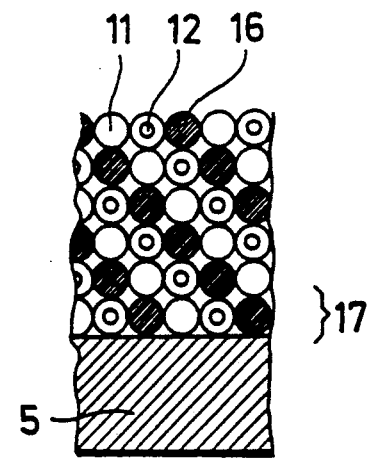

In the third embodiment shown in FIG. 5, lain in every layer are a steel wire 16, a superconducting wire 12, and a normally conducting wire 11. In this case, the layer group 17 is reduced to a single layer. The superconducting, normally conducting, and steel wires of neighboring layers are, for practical reasons, slightly displaced with respect to the layers lying beneath them.

Figure 6:
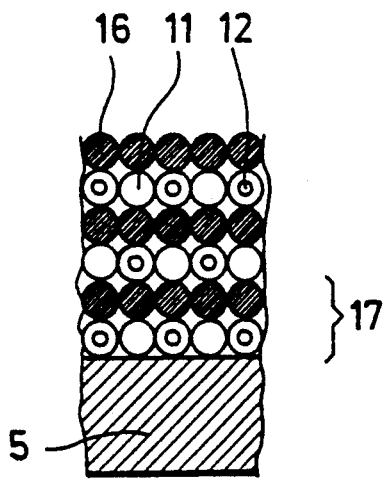
Figure 7:
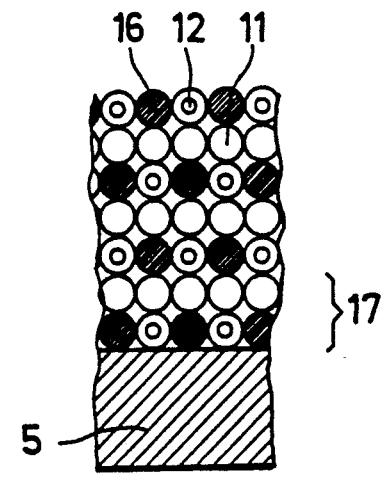

Likewise, it is possible according to the third embodiment of FIG. 6 to assemble a layer group 17 from an inner layer comprised of bifilar wound superconducting wire 12 and normally conducting wire 11, and from a corresponding outer layer of steel wire 16.

In the fifth embodiment, the winding configuration according to the invention includes a layer group 17 of a bifilar wound inner layer of steel wire and superconducting wire enclosed by an additional layer of normally conducting wire.

Figure 8:
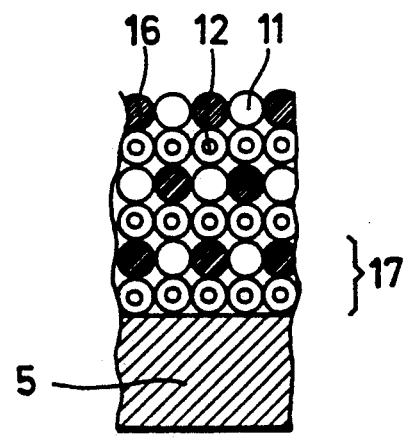

In the sixth embodiment according to FIG. 8, a layer group is comprised of an inner layer of superconducting wire 12 enclosed in a bifilar wound outer layer of steel wire and normally conducting wire.

Every arbitrary arrangement of the winding made from superconducting wire 12, normally conducting wire 11, and steel wire 16 within a layer group leads, in a similar fashion, to the purpose according to the invention of reducing the volume and weight of the entire winding configuration. The individual wires 11, 12, 16 can each be optimized for their respective functions of superconducting current carrying capability, normally conducting current carrying capability, and heat conduction capability as well as mechanical stability.

As a variation on the embodiments shown, the layer groups can also be comprised of more than two or three single layers.

The number of winding of normally conducting wire 11, of superconducting wire 12, and of steel wire 16 per lengthwise cross section through the winding configuration can vary as a function of position in the axial direction as well as in the radial direction. In this manner, it is in particular possible to effect a position dependent change in the average current density within the winding configuration. This leads to increased freedom in laying out the winding design while maintaining the principal requirement of magnetic field homogeneity.

The normally conducting wire 11 can, as is usually the case, be made from copper. Likewise, as far as the purpose of the present invention is concerned, another material with a conductivity better than $5.8 \times 10^7 \, Sm^{-1}$ can be used.

In all embodiments, in place of the steel wire 16, a wire can be used which is made from a material with a modulus of elasticity higher than that of copper at the operating temperature of the winding configuration which corresponds to a few Kelvin.

Instead of stainless steel as material for the steel wire 16, ferromagnetic steel can be used. At high operating field strengths the ferromagnetic steel experiences magnetic saturation and thereby furnishes a self-contribution to the entire magnetic field of pre-determinable size. This allows a shortening of the entire coil while maintaining a homogeneous magnetic field and a reduction in the tensile force on the individual wires 11, 12, 16.

Clearly, the invention is not limited to the embodiments shown, rather variation therefrom are possible without leaving the confines of the invention. The wire which is superconducting at the operating temperature, the normally conducting wire, and the support layers can be arranged in numerous variable ways. This is the case so long as the requirement is satisfied that, with the configuration chosen, the product between the current density and the magnetic field strength does not exceed the limiting value given by the coil construction, the cross section of normally conducting material is sufficiently large to carry the operating current when bringing-up the magnet as well as in case of a quench, and finally that the configuration of the winding made from normally conducting wire guaranties a rapid dispersion of the quench, whereby the inserted layers made from a material with a high modulus of elasticity are so arranged that they optimally support the winding made from superconducting wire independent of the electrical conductivity.

Since the normally conducting wire no longer serves a substantial support function, said wire can be composed of a material which, although having good electrical conductivity, does not exhibit a particularly high modulus of elasticity as is, for example, the case with aluminum. The utilization of aluminum would result in a further significant reduction in the weight of such a winding configuration, since the specific weight of aluminum is significantly less than that of copper, and due to the better conductively, a smaller aluminum wire cross section could even be chosen. It is furthermore clear that the insert layers composed of a material with a high modulus of elasticity need not be restricted to steel wire, rather that filaments from other substances with high modulus of elasticity, in particular from fiber-reinforced plastics, could be utilized as well. Finally, it would be possible to surround the entire winding configuration with an additional casing made from a material with a high modulus of elasticity.

We claim:

1. Winding configuration for a cryomagnet with at least one winding section having a parallel connection of radially and axially wound wires disposed therein said winding configuration comprising repeating multiple layer groups, said groups repeating in a radial direction and each layer group comprising:
   windings of superconducting wire, said superconduction wire being superconducting at an operating temperature of the winding configuration;
   windings of normally conducting wire formed from a material with a conductivity greater than $5.8 \times 10^7$ $Sm^{-1}$; and
   windings of wire formed from a material with a modulus of elasticity which is higher than the modules of elasticity of the normally conducting wire at the operating temperature of the winding configuration.

2. The winding configuration according to claim 1 wherein the superconduction wire is a monolithic wire and all of the wires having approximately the same cross sectional dimensions.

3. The winding configuration according to claim 1 wherein each layer group comprises:
   one layer of superconducting wire;
   one layer of normally conducting wire; and
   one layer of wire made from a material with a modulus of elasticity which is higher than that of the normally conducting wire at the operating temperature of the winding configuration.

4. The winding configuration according to claim 1 wherein each layer group comprises at least one first layer having two windings of a group of three windings and a second layer having a winding selected from the group of three winding types, said second layer winding being different from the two windings of the first layer, said group of three windings consisting of:
   windings of superconducting wire;
   windings of normally conducting wire formed from a material with a conductivity greater than $5.8 \times 10^7$ $Sm^{-1}$; and
   windings formed from a wire made from a material with a modulus of elasticity which is higher than that of the normally conducting wire at the operating temperature of the winding configuration.

5. The winding configuration according to claim 4 wherein each layer group includes a plurality of first layers and a second layer.

6. The winding configuration according to claim 4 wherein each layer group includes one first layer and a plurality of second layers.

7. The winding configuration according to claim 1 wherein the respective number of windings of superconductive wire, normally conducting wire and wire made of a material with a modulus of elasticity which is higher than that of the normally conducting wire at the operating temperature in a lengthwise cross-section through the winding configuration vary in the axial and/or radial direction of the winding configuration.

8. The winding configuration according to claim 1 wherein the normally conductive wire is copper and the wire made from a material with a modulus of elasticity which is higher than that of the normally conductive wire at the operating temperature is steel.

9. The winding configuration of claim 8 wherein said steel wire is ferromagnetic.

10. The winding configuration according to claim 2 wherein each layer group comprises at least one first layer having two windings of a group of three windings and a second layer having a winding selected from the group of three winding types, said second layer winding being different from the two windings of the first layer, said group of three windings consisting of:
    windings of superconducting wire;
    windings of copper wire; and
    windings of steel wire.

11. The winding configuration according to claim 10 wherein each layer group includes a plurality of first layers and a second layer.

12. The winding configuration according to claim 10 wherein each layer group includes one first layer and a plurality of second layers.

13. The winding configuration according to claim 2 wherein each layer group comprises:
    one layer of windings from superconducting wire;
    one layer of windings from normally conducting wire; and
    one layer of windings formed by wire made from a material with a modulus of elasticity which is higher than that of the normally conducting wire at the operating temperature of the winding configuration.

* * * * *